3,597,452
TREATMENT OF ETHYLENE OXIDE PROCESS
CYCLE WATER WITH AN AMINE RESIDUE
George J. Laemmle, Port Arthur, and James A. Jeansonne, Port Neches, Tex., assignors to Jefferson Chemical Company, Inc., Houston, Tex.
Filed Feb. 19, 1968, Ser. No. 706,395
Int. Cl. C07d 14
U.S. Cl. 260—348.5                     2 Claims

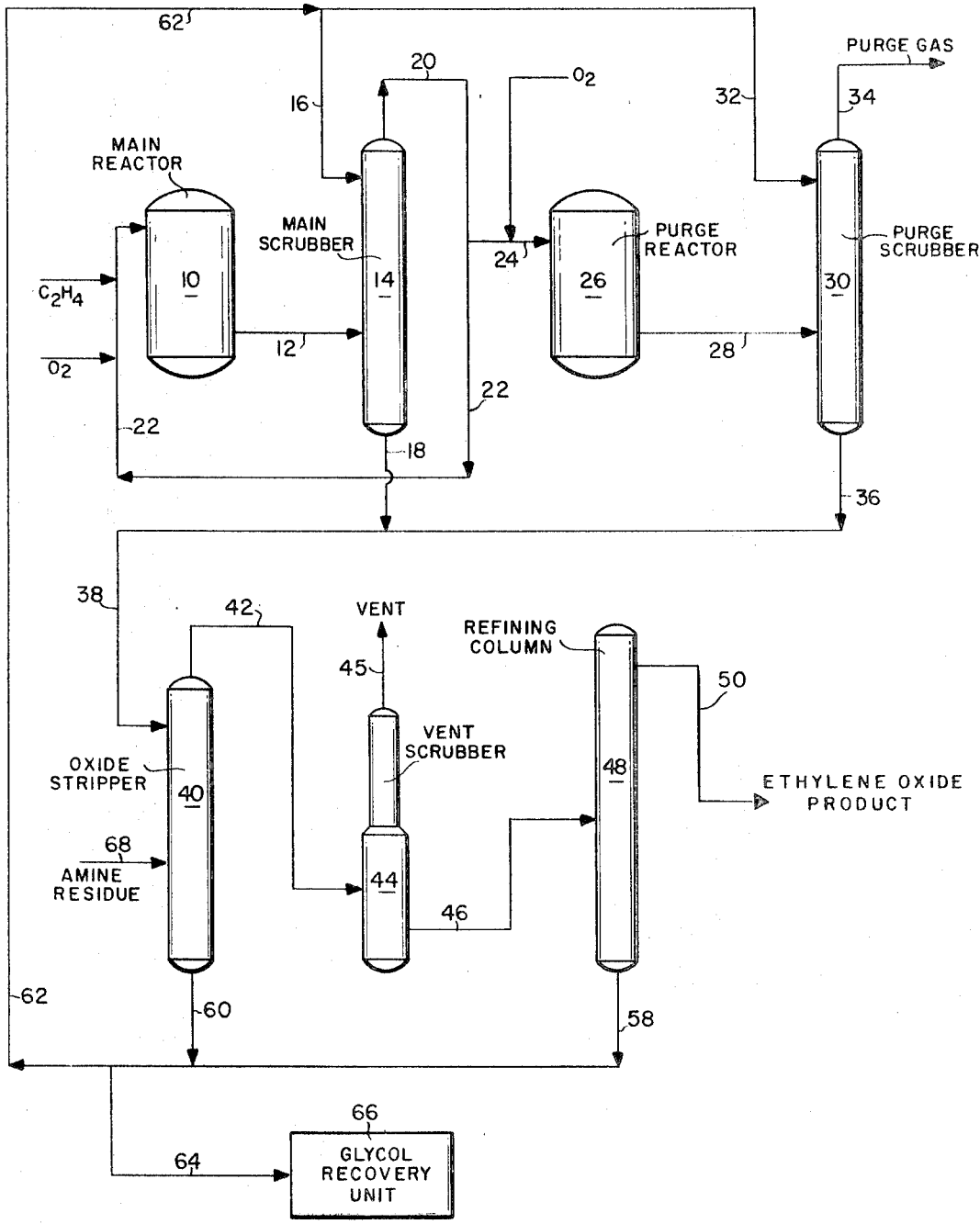

ABSTRACT OF THE DISCLOSURE

In a process for producing ethylene oxide by the direct catalytic oxidation of ethylene, the reaction products are scrubbed with a cycle water to recover the ethylene oxide product. Commercial quality ethylene glycol is also recoverable from this cycle water. A residue stream from the production of morpholine produced by the reaction of diethylene glycol with ammonia has been found to advantageously control the pH of this cycle water and facilitate the recovery of commercially useful ethylene glycol. Similar advantageous results are achieved by adding any amine which has a sufficiently high-boiling point such that it is not removed with the glycol during glycol recovery.

DESCRIPTION OF THE PRIOR ART

The production of ethylene oxide by the direct oxidation of ethylene with oxygen or air has increased considerably in recent years. The vapor-phase oxidation of ethylene produces, in addition to the ethylene oxide product, over-oxidation products such as carbon dioxide, small amounts of acids and aldehydes and water. The reaction products are quenched by scrubbing them with an aqueous stream, which will be hereinafter called "cycle water" to remove the ethylene oxide and transport it to a recovery and purification system wherein the ethylene oxide product is separated. In scrubbing the gaseous reaction products to recover the ethylene oxide, the acids, aldehydes and some of the carbon dioxide are removed from the gaseous stream which contains the balance of the carbon dioxide, along the unreacted ethylene and oxygen, plus the nitrogen which entered the system in which air is used.

The absorption of the carbon dioxide and organic acids into the cycle water causes a reduction in the pH to well within the acid range.

It is well known that ethylene oxide in aqueous solutions is hydrated to form ethylene glycol. This hydration is minimized when the pH is nearly neutral, but is accelerated to a great extent when the aqueous solution becomes acidic, for example, at a pH of under 4.5, or when the aqueous solution becomes more basic, for example, at a pH above 8. The portion of the dissolved ethylene oxide which is converted to ethylene glycol by reaction with the cycle water accumulates in the cycle water. Since this hydration reaction causes a sharp increase in by-product ethylene glycol formation and a corresponding drop in yield of ethylene oxide, it is advantageous to maintain the pH of the cycle water at a point where this reaction is minimized, that is, at a substantially neutral or only slightly acidic or basic condition, when the ethylene oxide is absorbed therein. Additionally, an acid pH of cycle water causes corrosion of press equipment in the processing unit itself.

In order to maximize the economic benefit from the production unit for ethylene oxide, it is desirable to recover a commercial grade of ethylene glycol from the cycle water. Generally this is done by bleeding off some of the accumulation of the cycle water resulting from the production of water in the reactor itself and transporting this cycle water bleed to a glycol recovery unit wherein by-product ethylene glycol is recovered.

Various attempts have been made to control the pH of the cycle water in ethylene glycol units, but due to one disadvantage or another have failed to prove satisfactory.

One such method of treating the cycle water has been to adjust the pH by adding alkali metal hydroxide such as potassium hydroxide or sodium hydroxide. While this method is successful in adjusting the pH of the cycle water and in minimizing the hydration of ethylene oxide to the glycol, this method creates problems elsewhere in the system. It has been found that an alkali metal carbonate becomes precipitated upon equipment in the system, especially in the reactor tube sheets and cycle gas compressors, necessitating frequent shutdown of the equipment for maintenance to remove the precipitated carbonate scale.

This problem was also attacked by adding borax as the treating agent to control the pH, but it was found that inordinately large quantities of borax were necessary and also resulted in a buildup of solids in the system, again necessitating frequent operational stoppages and maintenance for cleanup purposes.

Accordingly, it is the object of this invention to provide a treatment for the cycle water streams of an ethylene oxide process which will effectively control the pH thereof but not produce disadvantageous side affects.

It is a further object of this invention to provide a treatment for the cycle water of an ethylene oxide process which will facilitate the recovery of commercial quality ethylene glycol therefrom.

SUMMARY OF THE INVENTION

This invention relates to treatment of the cycle water used in ethylene oxide production processes wherein the pH of the cycle water is controlled utilizing an amine with a boiling point sufficiently high to allow the separation of glycols, especially ethylene glycol, from it or an amine residue, as hereinafter defined, to produce the desired operational results in the scrubbers following the reactors in the oxidation process. It is a particular aspect of this invention that pH of the cycle water is controlled at desired operational conditions, usually at a pH range between 5 and 7.5, without accompanying deleterious effects such as equipment fouling and unacceptable quality in glycols later recovered from the cycle water in a glycol recovery unit.

The amines which are useful in the practice of our invention are those which have boiling points sufficiently high that they are not removed in the glycol recovery distillation. The presence of amine in glycol causes ethylene glycol to become uacceptable for use as commercial grade antifreezes. The amines which are acceptable for use in the practice of our invention will be hereafter referred to as "high-boiling amines." Since ethylene glycol has a boiling point of 198° C., it is necessary that the amines used in the practice of our invention have a somewhat higher boiling point, usually around 225° C., to provide for a clean separation by distillation. These amines may be either primary, secondary or tertiary amines. The critical factors involved in the practice of our invention are that the amine used has the basicity which will result in raising the pH of the cycle water from the acid range to a substantially neutral condition and that they boil at a temperature sufficiently high to prevent the amine from contaminating the ethylene glycol when recovered in the ethylene glycol recovery unit.

Additionally, they should not decompose at temperatures at which the glycol is recovered.

The amine residues useful in the practice of our invention are those which fit the criteria of basicity and boiling point outlined above for amines to be used. Preferred residues are those produced in a process whereby diethyleneglycol is reacted with ammonia in the presence of hydrogen and a hydrogenation catalyst to produce morpholine or substituted derivatives thereof. The residues useful in the practice of our invention are produced when the above-mentioned morpholine process is carried out in a temperature range between about 150° C. to about 450° C. and under relatively high pressures ranging from about 30 to about 400 atmospheres.

When sufficient quantities of this amine residue are used to adjust the pH of the cycle water to the desired pH range, usually between about 5 and 7.5, we have discovered that corrosion problems in equipment are essentially eliminated, there is no disadvantageous settling out of chemicals as a result of the treatment, the conversion of ethylene oxide to the glycol is minimized, and the glycols recovered from the cycle water are of a sufficient commercial quality to be readily marketable.

DESCRIPTION OF THE DRAWING

The description of our invention which follows herein will be more readily understood with a knowledge of the process to which it applies in mind. Therefore, we offer the following general description of a process which is an example of processes to which our invention applies. It will be understood, however, that we do not limit the scope of our invention by the following description, but merely offer this description as a demonstration of a particular process or scheme of operation to which the cycle water treatment which we claim as our invention applies.

It will be understood by those skilled in the art, moreover, that our invention would be applicable to the treatment of any cycle water stream from which ethylene oxide and glycols are desired to be recovered.

Ethylene and air are charged to the main reactor 10 where the ethylene undergoes catalytic oxidation to produce ethylene oxide, along with various over-oxidation products such as carbon dioxide and minor amounts of acids and aldehydes and water. The reaction products leave the reactor 10 in a gaseous state by line 12 to the main scrubber 14 where they are quenched and scrubbed with cycle water entering through line 16. The cycle water, rich in ethylene oxide and containing the ethylene glycol produced by the hydration of ethylene oxide in the scrubber, is taken off the bottom of the main scrubber 14 through line 18 while the gaseous effluent of the main scrubber, which includes unreacted ethylene, lower hydrocarbon, oxygen, nitrogen and unabsorbed carbon dioxide, exit overhead through line 20. A portion of the overhead stream 20 containing unreacted ethylene is recycled to the main reactor through line 22, while the remainder of the stream, through line 24, enters the purge reactor 26 with additional air to react more completely the ethylene from the main reactor 10. The reaction products of the purge reactor 26 proceed through line 28 to the purge scrubber 30 where they are contacted with cycle water entering through line 32. The gaseous effluent 34 from the purge scrubber 30 contains oxygen, nitrogen, carbon dioxide, lower hydrocarbons and small amounts of unreacted ethylene and is removed from the system at this point.

The ethylene oxide-rich cycle water is taken off the bottom of the purge scrubber 30 through line 36 and joins the ethylene oxide-rich effluent from main scrubber 14. The cycle water, rich in absorbed ethylene oxide and containing ethylene glycol produced in the scrubbers by the hydration of ethylene oxide, along with absorbed acids, aldehydes and carbon dioxide, then moves to the ethylene oxide recovery section through line 38.

The ethylene oxide-rich cycle water is carried through line 38 to the oxide stripper 40. There the ethylene oxide is volatilized and removed overhead, along with some cycle water and other light gases, through line 42 which carries it to the vent scrubber 44 where the light gases, such as carbon dioxide, oxygen and nitrogen, are removed from the system through vent 45. The liquid bottoms effluent cycle water-rich in ethylene oxide product, moves through line 46 to the refining column 48 where the ethylene oxide products are separated from the remaining cycle water. These ethylene oxide products are removed overhead through line 50.

The remaining cycle water from which the ethylene oxide has been removed is discharged from the refining column 48 through line 58 and joins the cycle water from the oxide stripping column 40 which was removed therefrom through line 60. The cycle water then returns to the main scrubber 14 and the purge scrubber 30 through line 62.

As previously mentioned, the cycle water, during its passage through the main scrubber 14 and the purge scrubber 30, in additional to removing the ethylene oxide also removes over-oxidation products such as some carbon dioxide and various acids and aldehydes produced in small quantities in the direct oxidation process. Ethylene glycol produced through the hydration of ethylene oxide in the scrubbers is also removed in the cycle water. Since water is produced in the reaction also, there is an increase in the quantity of cycle water in the system. In order to maintain cycle water balance and to recover the ethylene glycol produced as a by-product, a bleed line 64 is used, which moves a portion of the cycle water to a glycol recovery unit 66, indicated schematically, where by-product ethylene glycol is recovered.

The cycle water during its passage through the scrubbers absorbs organic acids and carbon dioxide which tends to lower its pH. Since the conversion of ethylene oxide to ethylene glycol in an aqueous medium at elevated temperatures increases rapidly in the presence of free acids, it is necessary that the cycle water contacting the ethylene oxide-rich reaction product leave the main scrubber and purge scrubber at a substantially neutral pH, usually in the range of about 5 to about 7.5, in order that the yield of ethylene oxide be maximized. In addition to reducing the hydration reaction of the ethylene oxide to ethylene glycol, this substantially neutral pH of the cycle water minimizes corrosion in the equipment throughout the oxide recovery system and the glycol recovery unit. In order to prevent corrosion and hold ethylene glycol formation to an acceptably low level, it is necessary to raise the pH of the cycle water returning to the scrubbers to a range of about 5 to about 7.5 and, preferably, about 5.5 to about 6.5. In accomplishing this objective, it is a practice of our invention to add a high-boiling amine or an amine residue as hereinafter described through line 68 to the cycle water stream which is lean in ethylene oxide. This high-boiling amine or amine residue stream 68 can advantageously enter the cycle water stream into the bottoms of the oxide stripper 40 or the cycle water return lines 60 and 62. The objective of our invention will be accomplished as long as a sufficient quantity of the amine residue is added to hold the cycle water between pH 5 and pH 7.5 prior to the time the cycle water is introduced into the main scrubber 14 or the purge scrubber 30.

DESCRIPTION OF THE INVENTION

As hereinbefore mentioned, it is the practice of our invention to inject a high-boiling amine or an amine residue to form the treatment of our invention into the cycle water system after the ethylene oxide products have been stripped therefrom and prior to the return of the cycle water to the reaction product scrubbers. The amount of high-boiling amine or amine residue to be so injected is simply determined by taking a sample of the cycle water and adding the high-boiling amine or amine residue to it until the desired pH of about 5 to about 7.5 is reached.

This amount, of course, would vary, depending on the amount of over-oxidation products produced in the reactor and removed from the reactor effluents by the cycle water in the scrubber. The pH attained is usually from about 5 to about 7.5 when it enters the scrubbing columns in the ethylene oxide recovery process. It is an especially preferred embodiment to maintain the pH of the cycle water between about 5.5 and 6.5.

As used herein, the term "high-boiling amine" shall be defined as those primary, secondary, or tertiary amines having a boiling point sufficiently high so that ethylene glycol can be effectively recovered through distillation without being contaminated by the amine either through the amine being distilled with the glycol or decomposing with fractions which are distilled.

As hereinbefore mentioned, the high boiling amines which are useful in the practice of our invention are those with sufficiently basicity to increase the pH of the cycle water and which boil at temperatures sufficiently high to allow for the recovery of ethylene glycol from the cycle water without either boiling over into the ethylene glycol themselves or decomposing into lower boiling fractions which will contaminate the recovered glycol and render it useless as a commercial product. The boiling point for the high-boiling amines may be properly about 225° C. or higher. As hereinbefore mentioned, either primary, secondary or tertiary amines may be used in the process. The nitrogen atom will usually have attached to it one or more organic groups such as alkyl, cyclic, aryl, hydroxy substituted alkyl or aryl, or may be contained in a heterocyclic ring such as a morpholine ring. The nitrogen atom can be contained in a heterocyclic ring and also be substituted with an alkyl or aryl group in the third valence position such as an N-alkylmorpholine compound. The heterocyclic ring itself may be substituted with alkyl or aromatic groups. A few, but by no means all, examples of the high-boiling amines useful for the practice of our invention are diethanolamine, triethanolamine, N-phenyl diethanolamine, dicyclohexylamine, dibenzylethylamine, dibenzylamine, bis(2-hydroxyethyl)butylamine, N-benzylaniline, N-benzyl, N-ethylaniline, N-benzylortho-, meta- or para-toluidines, dioctylamine, diheptylamine, methyl bis(2-hydroxyethyl)amine, diphenylamine, 4 - aminodiphenylamine, 3-anilinophenol, 4-analinophenol, diphenylmethylamine, di-, ortho-, meta- or paratolylamine, 2,2',2''-trimethyltributylamine, triisoamylamine, triheptylamine, trihexylamine, tripentylamine. While the list of above examples is by no means exhaustive, it is to be remember the criteria as hereinbefore mentioned for the amine to be used in the successful practice of our invention.

The amine residue used in the practice of our invention is produced in a process for producing a morpholine compound wherein a glycol is reacted with ammonia in the presence of hydrogen and a hydrogenation catalyst at a temperature range of about 150° to about 400° C. and at a superatmospheric pressure between about 30 and 400 atmosphere. This process for producing the morpholine compounds is more specifically described in U.S. Pat. 3,151,112.

The process comprises reacting a dialkylene glycol with ammonia in contact with hydrogen and a hydrogenation catalyst, said glycol having the formula:

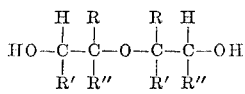

in which R, R' and R'' are selected from the group consisting of hydrogen, alkyl and aryl radicals.

Ordinarily, a temperature between about 150° C. to about 400° C. and a pressure between about 30 to about 400 atmospheres will be employed.

A dialkylene glycol, described hereinabove, and including such glycols as diethylene glycol, dipropylene glycol, di-1,2-butylene glycol, di-2,3-butylene glycol, is reacted with ammonia in the presence of hydrogen and a hydrogenation catalyst to produce morpholines. The term "morpholines" employed herein is used in the generic sense and is meant to include the compound from which the name is derived and the carbon substituted alkyl and aryl derivatives thereof. Thus, for example, this term includes morpholine and its mono-, di-, tri- and tetra-alkyl or aryl substituted derivatives. In general, the substituted group will be a lower alkyl radical. It is important to note that only those glycols having the hydroxyl radical attached to a primary or secondary carbon atom are suitable for this reaction.

The process is generally conducted at an elevated temperature and under pressure. The reaction temperature, therefore, may be between about 150° C. to about 400° C., although it has been found preferable to operate in the relatively narrow temperature range between 200° C. to 300° C. Desirably, the process is conducted under relatively high pressures ranging from about 30 to about 400 atmospheres. As a general rule, however, operation of the process between 65 to 225 atmospheres is preferred.

The presence of hydrogen is critical for the proper and efficient conduct of the instant process. While it is not necessary for hydrogen to constitute the entire atmosphere within the reaction vessel, it is necessary that the hydrogen partial pressure amount to a substantial part of the reaction atmosphere. Thus, the hydrogen should contribute at least 10 and preferably between 20 to 200 atmospheres of pressure to the total pressure in the system. Generally, the reaction vessel is swept clean with hydrogen gas and thereafter a predetermined amount of hydrogen is pumped into the sealed vessel. When the vessel is heated to bring it up to reaction temperatures, the hydrogen and reactants contained therein will bring the total pressure into the operating range indicated above.

A large number of hydrogenation catalysts may be employed in the morpholine process. Such catalysts, also known as hydrogenation-dehydrogenation catalysts, include one or more of the metals from the group including copper, nickel, cobalt, chromium, molybdenum, manganese, platinum, palladium and rhodium, and the oxides of these metals. The metals or their oxides may be employed in combination with the normally nonreducible oxides such as chromium oxide $Cr_2O_3$, molybdenum oxide $Mo_2O_3$ and manganese oxide MnO. The amount of the nonreducible oxide employed may be varied considerably but preferably should be present in minor amounts. The preferred catalysts, that is, those most effective for the reaction, are the metals or oxides of copper, nickel, cobalt and chromium. A particularly satisfactory catalyst is one in which the active components consist essentially of 75 mol percent nickel, 22 mol percent copper and 1.6 mol percent chromium. This catalyst is readily prepared by ignition of a mixture of the corresponding nitrate salts followed by a reducing treatment, although other well known means of preparation may be employed.

The ratio of reactants, that is, the ratio of ammonia to glycol, has a surprising effect on the efficiency of this process. While the process may be conducted by reacting equal molar amounts of ammonia and glycol, it has been observed that if there is a molar excess of ammonia the yields of the desired product are sharply increased. Optimum yields will be obtained when the molar ratio of ammonia to glycol is about 3:1. Molar ratios may be employed in the range from 1:1 to about 10:1. It is not necessary that the reagents for this reaction be in an anhydrous condition.

The crude reaction product obtained from the above-described reaction is then subjected to distillation to remove the morpholine product and certain low-boiling materials, leaving a high-boiling amine composition as the amine residue. This residue is further distilled at 10 mm. mercury and 150° C. to remove a recycle stream which is returned to the morpholine reactor. The bottoms from this distillation is the amine residue used in the practice of this invention, though the residue prior to the distillation to remove the recycle stream is acceptable for the treatment of the ethylene oxide process cycle water.

The high-boiling amine residue is a complex composition which is generally a dark to black water-soluble material. This residue typically has the following properties:

Description of the property

| | |
|---|---|
| Equivalent weight | 130–150 |
| Total amine, meq./g. (titratable) | 6.2–7.4 |
| Primary amine, meq./g. | 1.3–1.8 |
| Secondary amine, meq./g. | 0–0.7 |
| Tertiary amine, meq./g. | 4.4–5.9 |
| Specific gravity, 20/20° C. | 1.078 |
| Viscosity, cs., 100° F. | 26 |

The amine residues used in the practice of our invention are water-soluble liquids having a typical ASTM boiling range with an initial boiling point in the range of 242° C. to 265° C. at atmospheric pressure. This is well above the boiling point of ethylene glycol (198° C.) and does not contaminate the recovered ethylene glycol.

It will be seen from the following examples, which are offered for purposes of illustration only and should not be construed as limiting the scope of our invention, that the aforementioned objectives of our invention are accomplished when the cycle water is treated with the amine residue as hereinbefore described.

EXAMPLE I

In an ethylene oxide unit having an oxide recovery system as illustrated in the attached drawing, cycle water was circulated at a rate of 3,000 gallons a minute. An amine residue having an analysis as follows:

| | |
|---|---|
| Equivalent weight | 139.4 |
| Total amine, meq./g. (titratable) | 7.52 |
| Primary amine, meq./g. | 1.66 |
| Tertiary amine, meq./g. | 4.57 |
| Total nitrogen, meq./g. | 7.93 |
| ASTM boiling point ° C. IBP [1] | 242 |

[1] Initial boiling point.

was added to the system using a rod pump at a maximum rate of 0.21 gallon per minute. The pH of the cycle water was maintained at a value of 6 in the system with the use of this injection rate. This illustrates that the amine residue used in the treatment of my invention is effective to control the pH of the cycle water system. Cycle water is continuously bled from the unit to a glycol recovery system.

EXAMPLE II

Two samples of the cycle water of Example I were partially dewatered on a batch distillation column at atmospheric pressure with no reflux. The last 10% of water was removed on a batch still at 250 mm. mercury and 1:1 reflux ratio. Ethylene glycol recovered from the cycle water had a 0–5 platinum cobalt color and met specification tests for antifreeze grade ethylene glycol as illustrated on the following table:

| Property | Specification | Recovered glycol |
|---|---|---|
| Acidity, weight percent acetic acid. | 0.01 maximum | <0.001 |
| Appearance | Clear and substantially free of suspended matter. | O.K. |
| Ash, weight percent | 0.01 maximum | <0.01 |
| Boiling range ASTM, ° C. | IBP-170 minimum | 195–197 |
| | DP-240 maximum | 200–205 |
| Chloride, p.p.m. | 1.0 maximum | <1 |
| Color, Pt-Co scale | 15 maximum | 0–5 |
| Ethylene glycol, weight percent | 95.0 minimum | >95 |
| Freezing point, ° F. | −35.5 maximum | O.K. |
| Odor | Mild, characteristic | O.K. |
| Specification grade 20/20° C. | 1.113–1.116 | O.K. |
| Water, weight percent | 0.5 maximum | 0.06–0.2 |

The foregoing example illustrates that the amine residue used in the treatment of our invention facilitates the recovery of an acceptable commercial grade ethylene glycol from the cycle water stream without contaminating said glycol.

EXAMPLE III

Potassium hydroxide was used in the cycle water system to maintain the pH of the cycle water above 5.0 to prevent excessive conversion of ethylene oxide to ethylene glycol and to prevent excessive corrosion due to a highly acidic cycle water. These strong inorganic bases reacted with carbon dioxide present in the reactor off gases as well as the organic acids formed in the process. The resulting bicarbonates and carbonates are entrained in the scrubber off-gas and separate when high temperatures are encountered. The separated carbonates coat the reactor inlets and impellers of the gas compressors, in addition to other equipment, causing shut down of the reactor after three to six months operation due to high pressure drops and of the rotary equipment due to vibration caused by the deposition of these salts. By using high-boiling amines or the amine residues above described in the cycle water treatment, the deposition of carbonates is averted.

Various modifications and improvements of the above-described invention will be obvious to one skilled in the art and is intended to be included in the scope of the claims appended hereto.

We claim:

1. In a method for producing ethylene oxide comprising the steps of catalytically reacting ethylene to produce a reaction gas, scrubbing the reaction gas with cycle water, the improvement which comprises adjusting the pH of the cycle water by introducing therein a sufficient quantity of an amine having an atmospheric boiling point of about 225° C. or higher.

2. The method of claim 1 wherein the amine is an amine residue prepared in the process for the production of a morpholine compound by reacting a glycol having the formula:

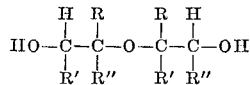

with ammonia in a hydrogen atmosphere at a temperature in the range of from about 150° to about 400° C. and a pressure of from about 30 to about 400 atmospheres.

No references cited.

NORMA S. MILESTONE, Primary Examiner

U.S. Cl. X.R.

260—348